US011870736B2

(12) United States Patent
Xu et al.

(10) Patent No.: US 11,870,736 B2
(45) Date of Patent: Jan. 9, 2024

(54) SEARCH SPACE SET ACTIVATION

(71) Applicant: QUALCOMM Incorporated, San Diego, CA (US)

(72) Inventors: Huilin Xu, Temecula, CA (US); Linhai He, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/394,990

(22) Filed: Aug. 5, 2021

(65) Prior Publication Data

US 2022/0045832 A1 Feb. 10, 2022

Related U.S. Application Data

(60) Provisional application No. 63/062,984, filed on Aug. 7, 2020.

(51) Int. Cl.
*H04L 5/00* (2006.01)
*H04W 72/23* (2023.01)

(52) U.S. Cl.
CPC ........... *H04L 5/0098* (2013.01); *H04W 72/23* (2023.01)

(58) Field of Classification Search
CPC ............................. H04L 5/0098; H04W 72/23
See application file for complete search history.

(56) References Cited

U.S. PATENT DOCUMENTS

| 8,917,605 | B2 | 12/2014 | Pelletier et al. |
| 8,982,752 | B2 | 3/2015 | Miki et al. |
| 9,306,723 | B2 | 4/2016 | Nory et al. |
| 9,788,324 | B2 | 10/2017 | Yan et al. |
| 2019/0305867 | A1 | 10/2019 | Tseng et al. |
| 2020/0389874 | A1* | 12/2020 | Lin ........................ H04L 5/0096 |

FOREIGN PATENT DOCUMENTS

WO    WO-2020102146 A2    5/2020

OTHER PUBLICATIONS

International Search Report and Written Opinion—PCT/US2021/045067—ISA/EPO—dated Nov. 19, 2021.

(Continued)

*Primary Examiner* — Ronald B Abelson
(74) *Attorney, Agent, or Firm* — MG-IP Law, P.C.

(57) ABSTRACT

Disclosed are various techniques for wireless communication. In an aspect, a user equipment (UE) may monitor a physical downlink control channel (PDCCH) monitoring occasion defined by an active search space (SS) set. The UE may receive, during the PDCCH monitoring occasion, a downlink control information (DCI). In response, the UE may activate at least one deactivated SS set based on the DCI and a mapping that associates an SS set to a DCI type, DCI format, transmission direction, or specific combinations thereof. In another aspect, a UE may monitor a subset less than all of PDCCH monitoring occasions defined by an active SS set. The UE may receive, during a PDCCH monitoring occasion, a DCI. In response, the UE may monitor a larger number of PDCCH monitoring occasions defined by the active SS set.

44 Claims, 11 Drawing Sheets

(56) References Cited

OTHER PUBLICATIONS

Qualcomm Incorporated: "Potential Techniques for UE Power Saving", 3GPP Draft, 3GPP TSG-RAN WG1 #96, R1-1903016 Potential Techniques for UE Power Saving, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/ Docs/R1%2D1903016%2Ezip [retrieved on Feb. 16, 2019] sections 2-4, paragraph[2. 2 .1]—paragraph [2. 2. 2] paragraph [2.3 .1.1]—paragraph [2. 3 .1. 2] paragraph[3. 3 .1]—paragraph [3.3.3] paragraph [3.4.1]—paragraph [3. 4 .1]. sections 1-3, in particular sections 3.1, 3.2, 3.3, 3.4.1. 3.4.2.

* cited by examiner

SEARCH SPACE SET ACTIVATION

CROSS-REFERENCE TO RELATED APPLICATION

This application claims priority to U.S. Provisional Patent Application No. 63/062,984, filed Aug. 7, 2020, entitled "SEARCH SPACE ACTIVATION," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Downlink Control Information (DCI) provides a user equipment (UE) with information such as physical layer resource allocation, power control commands, and hybrid automatic repeat request (HARQ) information for both uplink and downlink. DCI is transmitted on the Physical Downlink Control Channel (PDCCH), which must be continually monitored by the UE. A search space (SS) defines PDCCH monitoring occasions, which are locations in the time and frequency domains which the UE should monitor for PDCCH. Each SS is associated with a single aggregation level, e.g., the number of control channel elements (CCEs)/number of resources associated for each PDCCH.

An SS set defines search spaces for multiple aggregation levels. A maximum of ten SS sets can be configured per UE per bandwidth part (BWP). An SS set may be a common SS (CSS) set for scheduling broadcast data, UE group specific data, and limited scheduling of UE-specific data, or a UE-specific SS (USS) set for full scheduling functions of UE-specific data. Each SS set defines a periodicity (e.g., the number of slots in the period), an offset in the slot, slots in each period where PDCCH is monitored, and starting symbols of the PDCCH monitoring occasions within the slot. PDCCH monitoring is within a single monitoring occasion, and monitoring occasions do not cross slot boundaries. A UE is typically provisioned with multiple SS sets by the network.

PDCCH monitoring accounts for a large portion—typically, more than half—of a UE's power consumption. For a class of UEs known as "reduced capability" UEs, the target requirement is that a battery should be able to power the UE for weeks or even years, and that the UE have very low duty cycle traffic. To achieve this target, a mechanism has been proposed to deactivate some, but not all, of the SS sets supported by the UE. Deactivation of an SS set means that the UE will not monitor for PDCCH resources within the monitoring occasions defined by the deactivated SS set. However, there is currently no defined mechanism by which a UE can activate a deactivated SS set.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

To overcome the technical disadvantages of conventional systems and methods, mechanisms by which a user equipment (UE) may activate a deactivated search space (SS) set are provided.

In an aspect, a method of wireless communication performed by a user equipment (UE) includes monitoring a physical downlink control channel (PDCCH) monitoring occasion defined by an active search space (SS) set; receiving, during the PDCCH monitoring occasion, a downlink control information (DCI); and activating at least one deactivated SS set based on the DCI and a mapping that associates an SS set to a DCI type, DCI format, transmission direction, or specific combinations thereof.

In an aspect, a method of wireless communication performed by a user equipment (UE) includes monitoring a subset less than all of physical downlink control channel (PDCCH) monitoring occasions defined by an active search space (SS) set; receiving, during a PDCCH monitoring occasion, a downlink control information (DCI); and monitoring a larger number of PDCCH monitoring occasions defined by the active SS set.

In an aspect, a user equipment (UE) includes a memory; at least one transceiver; and at least one processor communicatively coupled to the memory and the at least one transceiver, the at least one processor configured to: monitor a physical downlink control channel (PDCCH) monitoring occasion defined by an active search space (SS) set; receive, via the at least one transceiver, during the PDCCH monitoring occasion, a downlink control information (DCI); and activate at least one deactivated SS set based on the DCI and a mapping that associates an SS set to a DCI type, DCI format, transmission direction, or specific combinations thereof.

In an aspect, an UE includes a memory; at least one transceiver; and at least one processor communicatively coupled to the memory and the at least one transceiver, the at least one processor configured to: monitor a subset less than all of physical downlink control channel (PDCCH) monitoring occasions defined by an active search space (SS) set; receive, via the at least one transceiver, during a PDCCH monitoring occasion, a downlink control information (DCI); and monitor a larger number of PDCCH monitoring occasions defined by the active SS set.

In an aspect, a user equipment (UE) includes means for monitoring a physical downlink control channel (PDCCH) monitoring occasion defined by an active search space (SS) set; means for receiving, during the PDCCH monitoring occasion, a downlink control information (DCI); and means for activating at least one deactivated SS set based on the DCI and a mapping that associates an SS set to a DCI type, DCI format, transmission direction, or specific combinations thereof.

In an aspect, a UE includes means for monitoring a subset less than all of physical downlink control channel (PDCCH) monitoring occasions defined by an active search space (SS) set; means for receiving, during a PDCCH monitoring occasion, a downlink control information (DCI); and means for monitoring a larger number of PDCCH monitoring occasions defined by the active SS set.

In an aspect, a non-transitory computer-readable medium storing computer-executable instructions that, when executed by a user equipment (UE), cause the UE to: monitor a physical downlink control channel (PDCCH) monitoring occasion defined by an active search space (SS) set; receive, during the PDCCH monitoring occasion, a downlink control information (DCI); and activate at least one deactivated SS set based on the DCI and a mapping that associates an SS set to a DCI type, DCI format, transmission direction, or specific combinations thereof.

In an aspect, a non-transitory computer-readable medium storing computer-executable instructions that, when executed by a UE, cause the UE to monitor a subset less than all of physical downlink control channel (PDCCH) monitoring occasions defined by an active search space (SS) set; receive, during a PDCCH monitoring occasion, a downlink control information (DCI); and monitor a larger number of PDCCH monitoring occasions defined by the active SS set.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
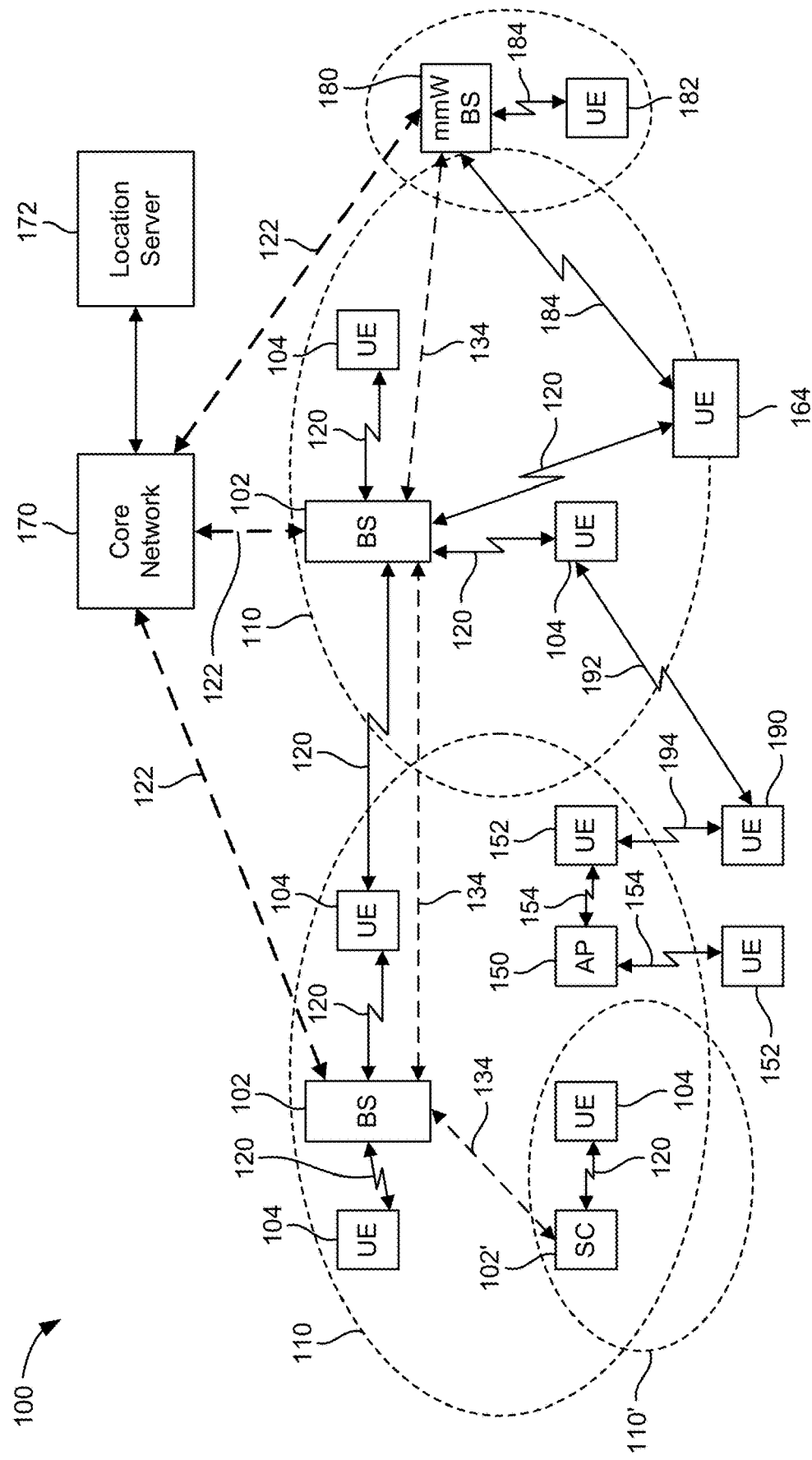
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
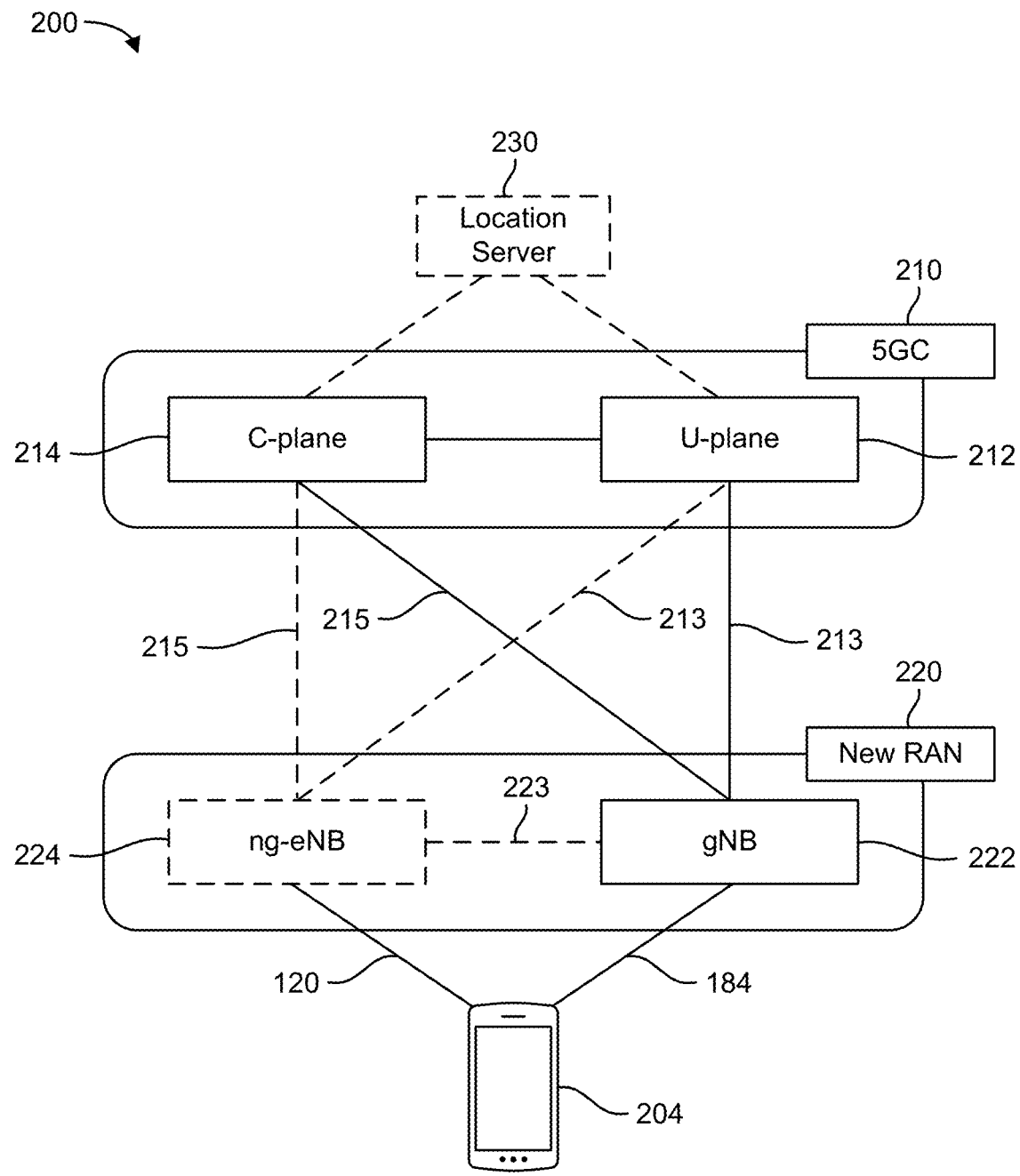
FIGS. 2A and 2B illustrate example wireless network structures, according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
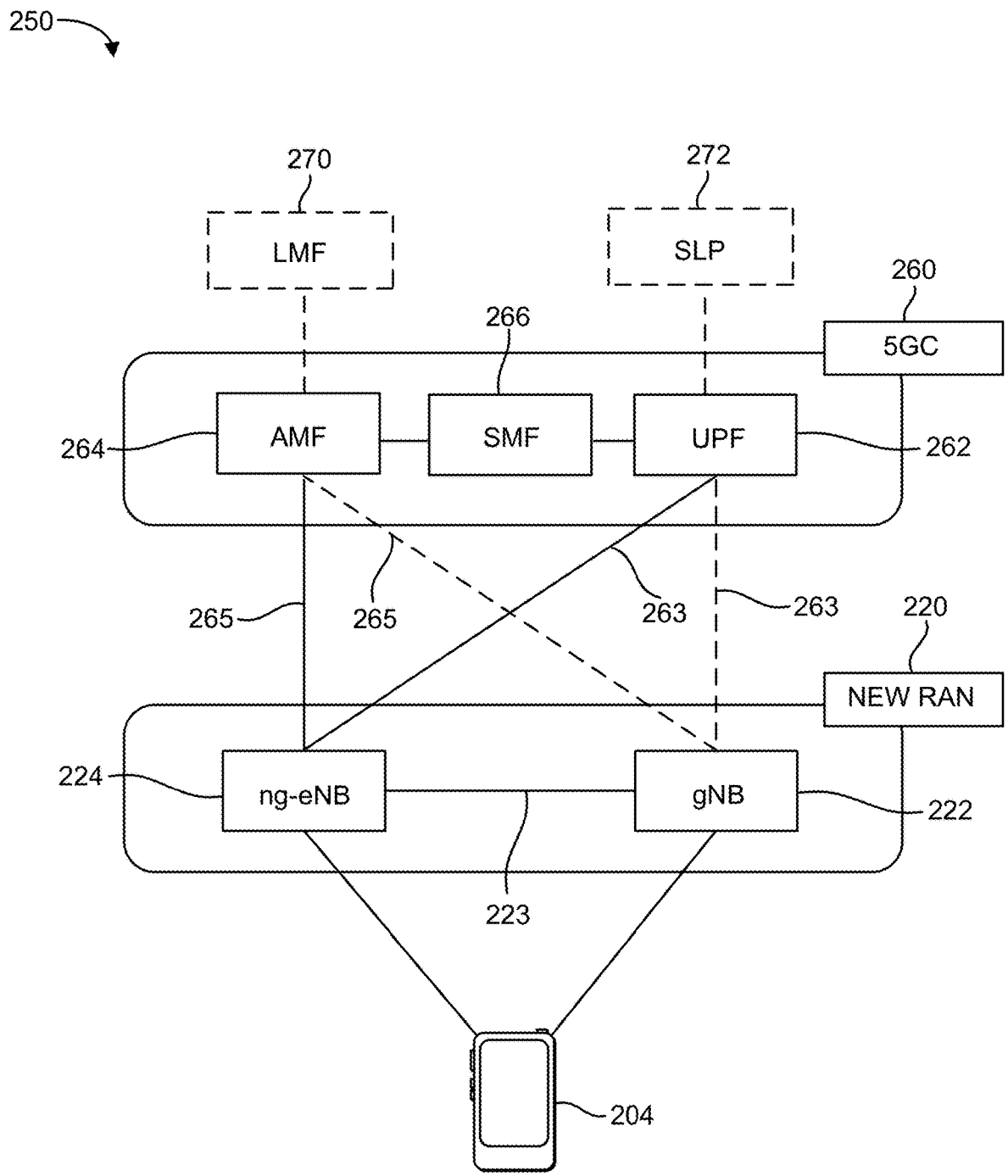

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
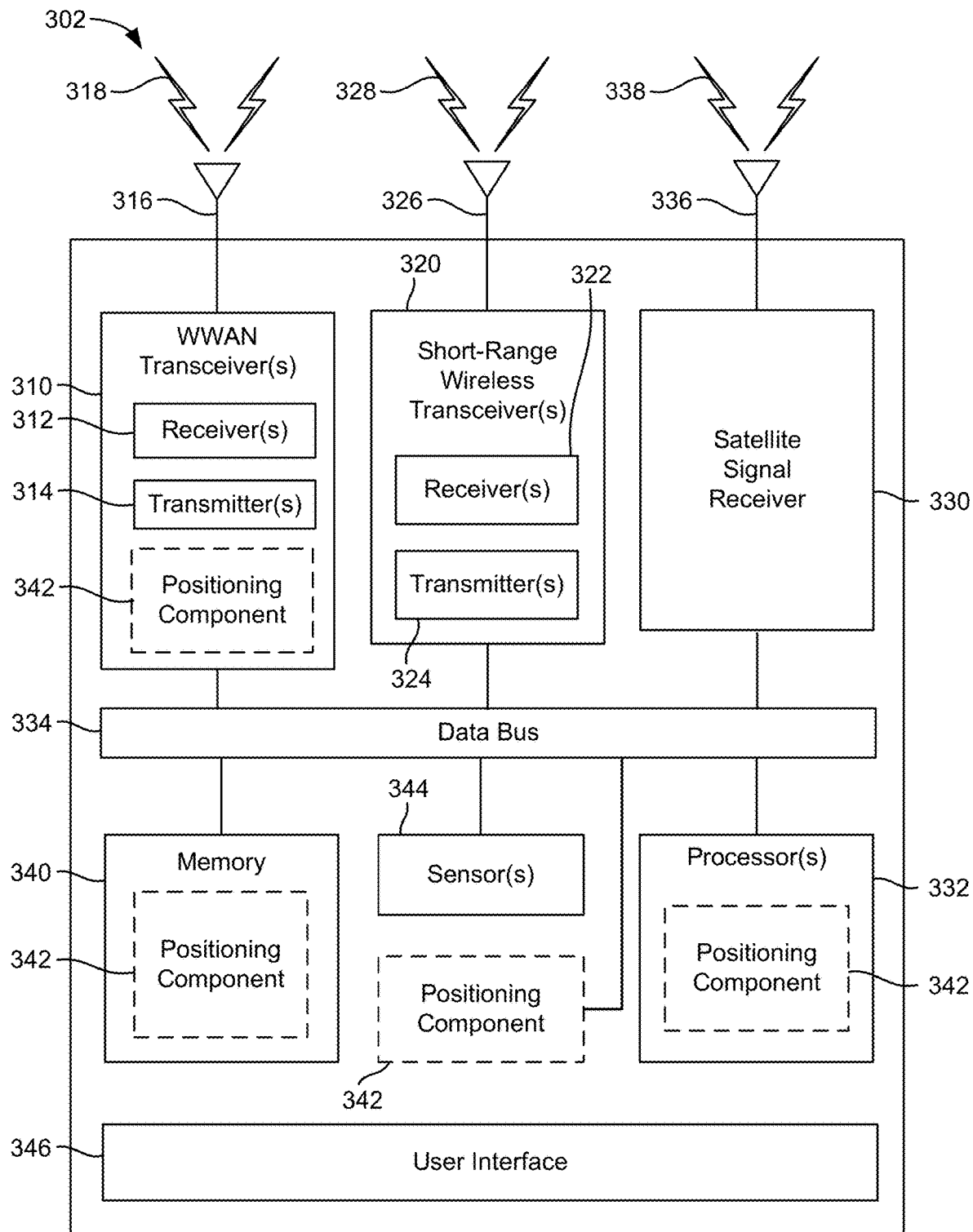
FIGS. 3A, 3B, and 3C are simplified block diagrams of several sample aspects of components that may be employed in a user equipment (UE), a base station, and a network entity, respectively, and configured to support communications as taught herein.
Figure 3B:
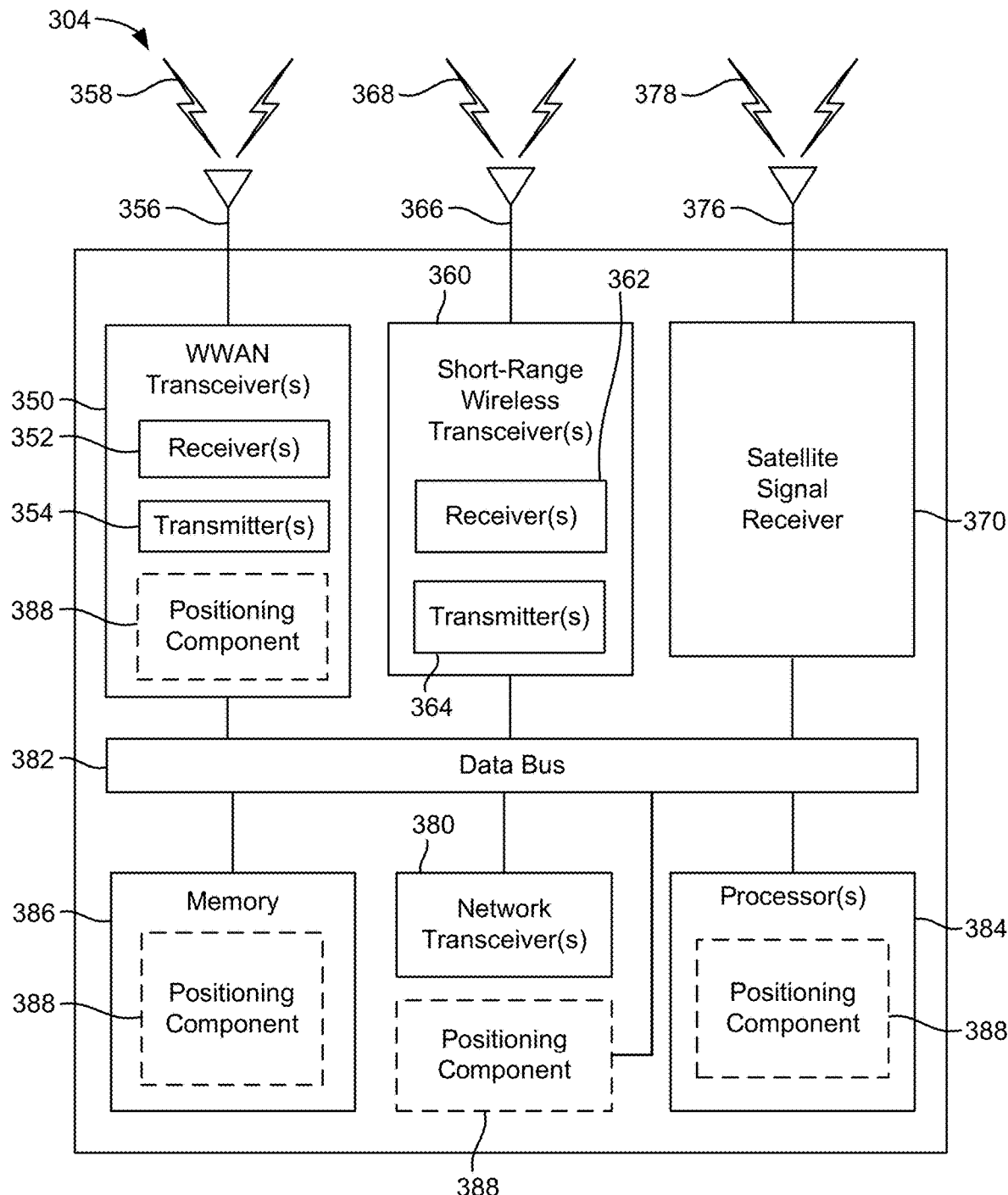
Figure 3C:
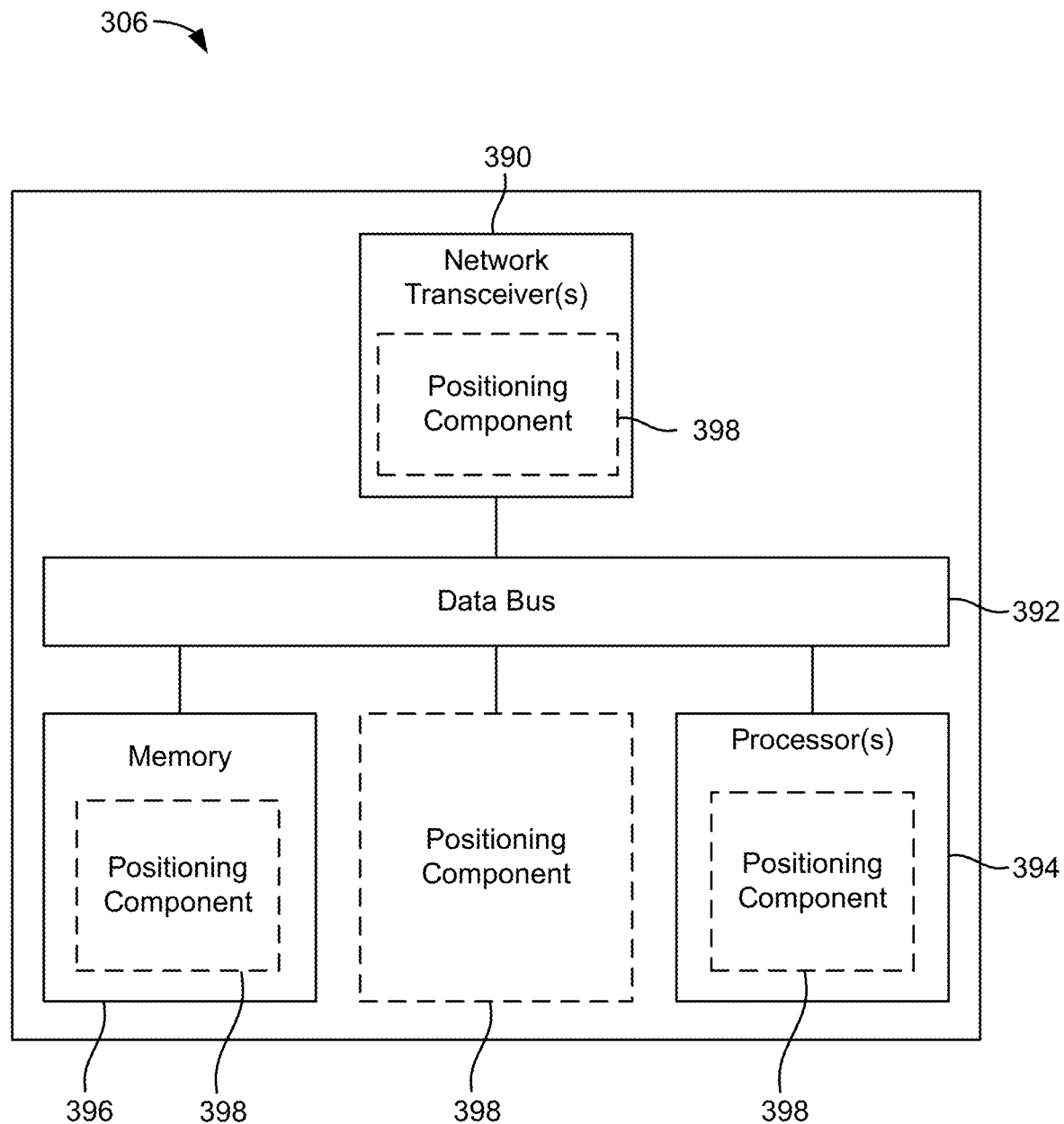

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signal 318 and signal 358 (e.g., messages, indications, information, and so on), respectively, and conversely, for receiving and decoding signal 318 and signal 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signal 318 and signal 358, respectively, and one or more receivers 312 and 352, respectively, for receiving and decoding signal 318 and signal 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signal 328 and signal 368 (e.g., messages, indications, information, and so on), respectively, and conversely, for receiving and decoding signal 328 and signal 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signal 328 and signal 368, respectively, and one or more receivers 322 and 362, respectively, for receiving and decoding signal 328 and signal 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signal 338 and signal 378, respectively. Where the satellite signal receivers 330 and 370 are satellite positioning system receivers, the satellite positioning/communication signal 338 and signal 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signal 338 and signal 378 may be communication signals (e.g., carrying control and/or user data) originating from a 5G network. The satellite signal receivers 330 and 370 may comprise any suitable hardware and/or software for receiving and processing satellite positioning/communication signal 338 and signal 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 172, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
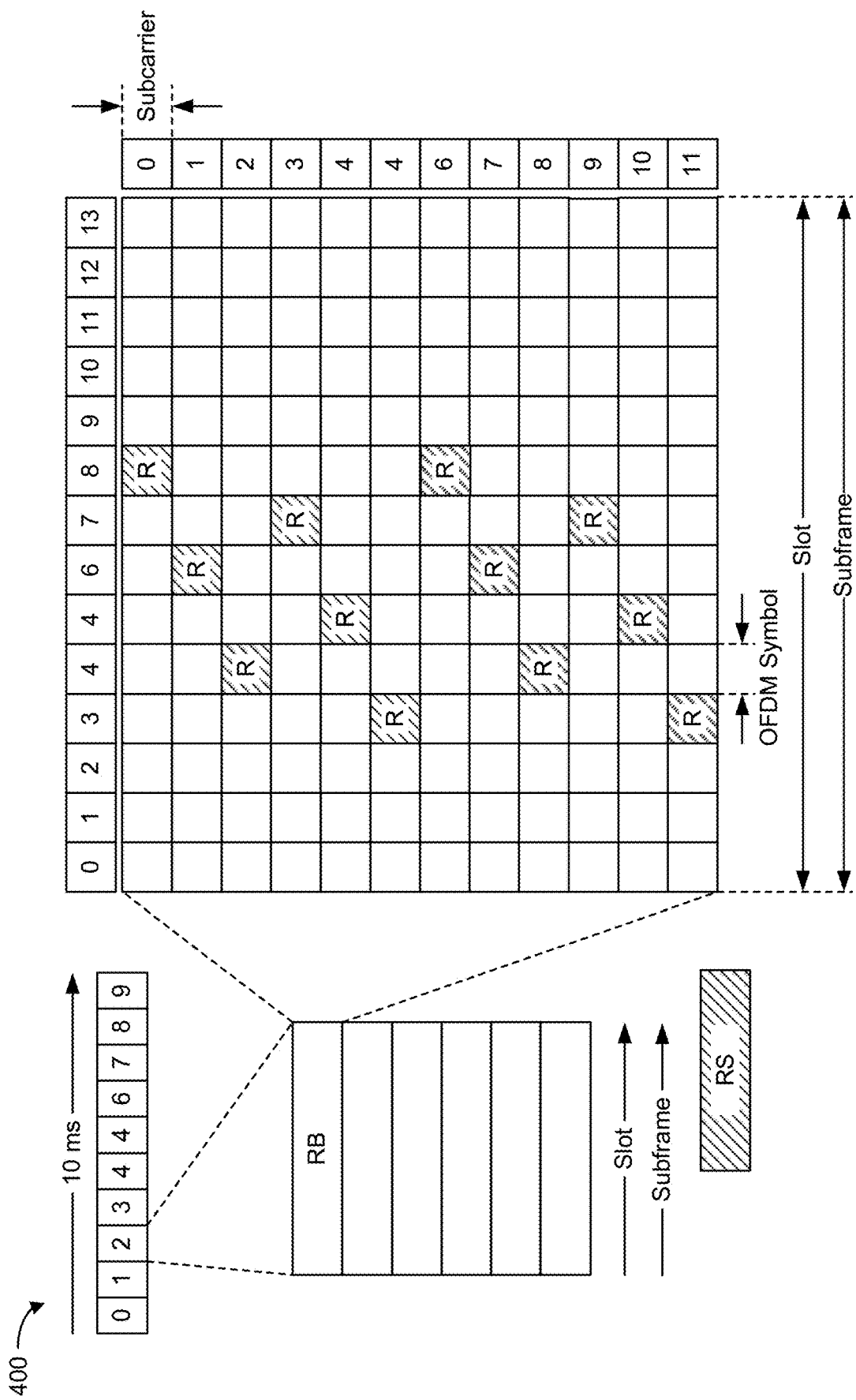
FIGS. 4A and 4B are diagrams illustrating example frame structures and channels within the frame structures, according to various aspects.

FIG. 4A is a diagram 400 illustrating an example of a downlink frame structure, according to aspects.

Figure 4B:
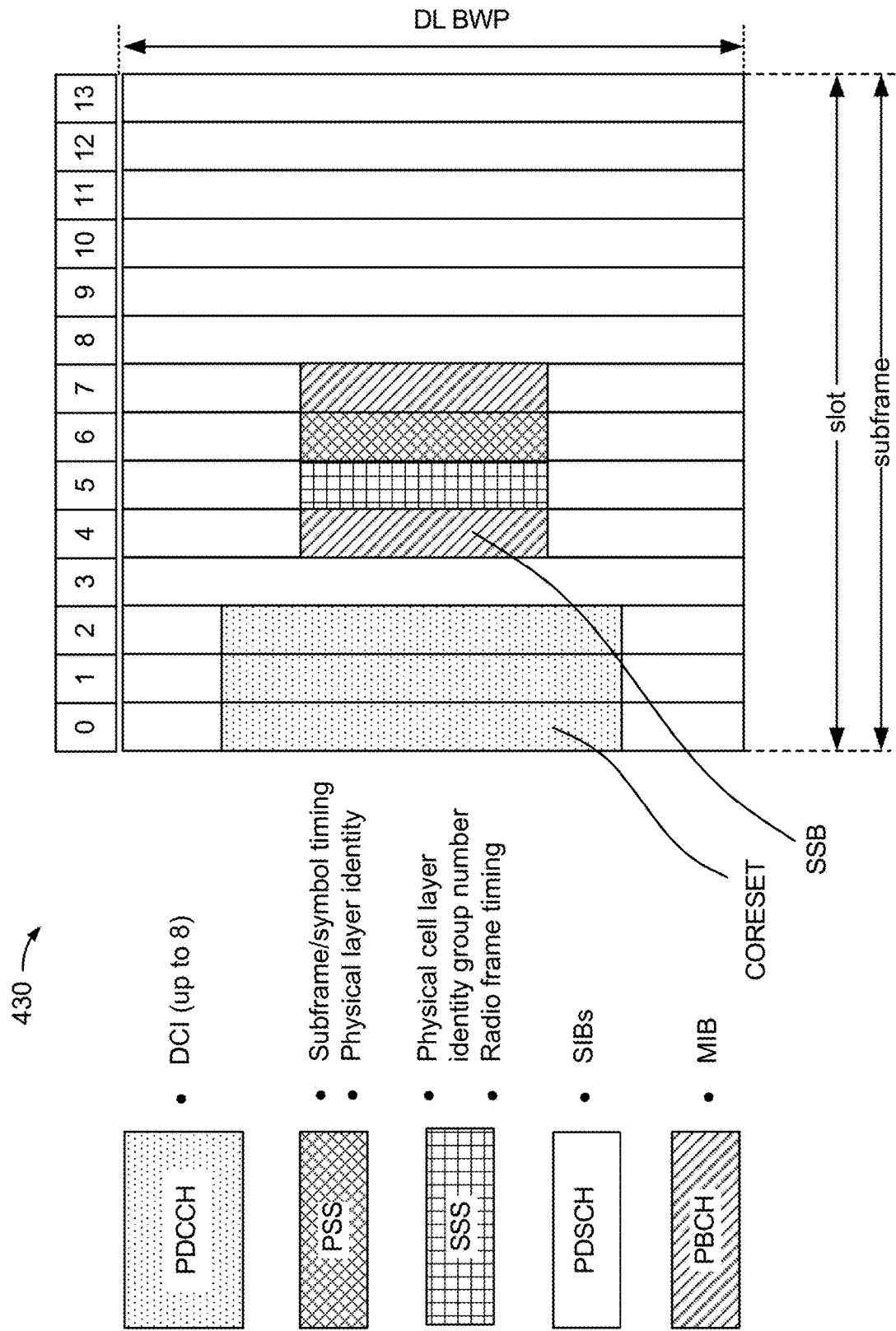

FIG. 4B is a diagram 430 illustrating an example of channels within the downlink frame structure, according to aspects. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Slot | Slots/ Sub-frame | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 200 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying reference signals (labeled "R").

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

A search space (SS) defines PDCCH monitoring occasions, which are locations in the time and frequency domains which the UE 104 should monitor for PDCCH. Each SS is associated with a single aggregation level, e.g., the number of control channel elements (CCEs)/number of resources associated for each PDCCH.

An SS set defines search spaces for multiple aggregation levels. A maximum of ten SS sets can be configured per UE 104 per bandwidth part (BWP). An SS set may be a common SS (CSS) set for scheduling broadcast data, UE group specific data, and limited scheduling of UE-specific data, or a UE-specific SS (USS) set for full scheduling functions of UE-specific data. Each SS set defines a periodicity (e.g., the number of slots in the period), an offset in the slot, and starting symbols of the PDCCH monitoring occasions within the slot. PDCCH monitoring occasions do not cross slot boundaries. A UE 104 is typically provisioned with multiple SS sets by the network.

Figure 5:
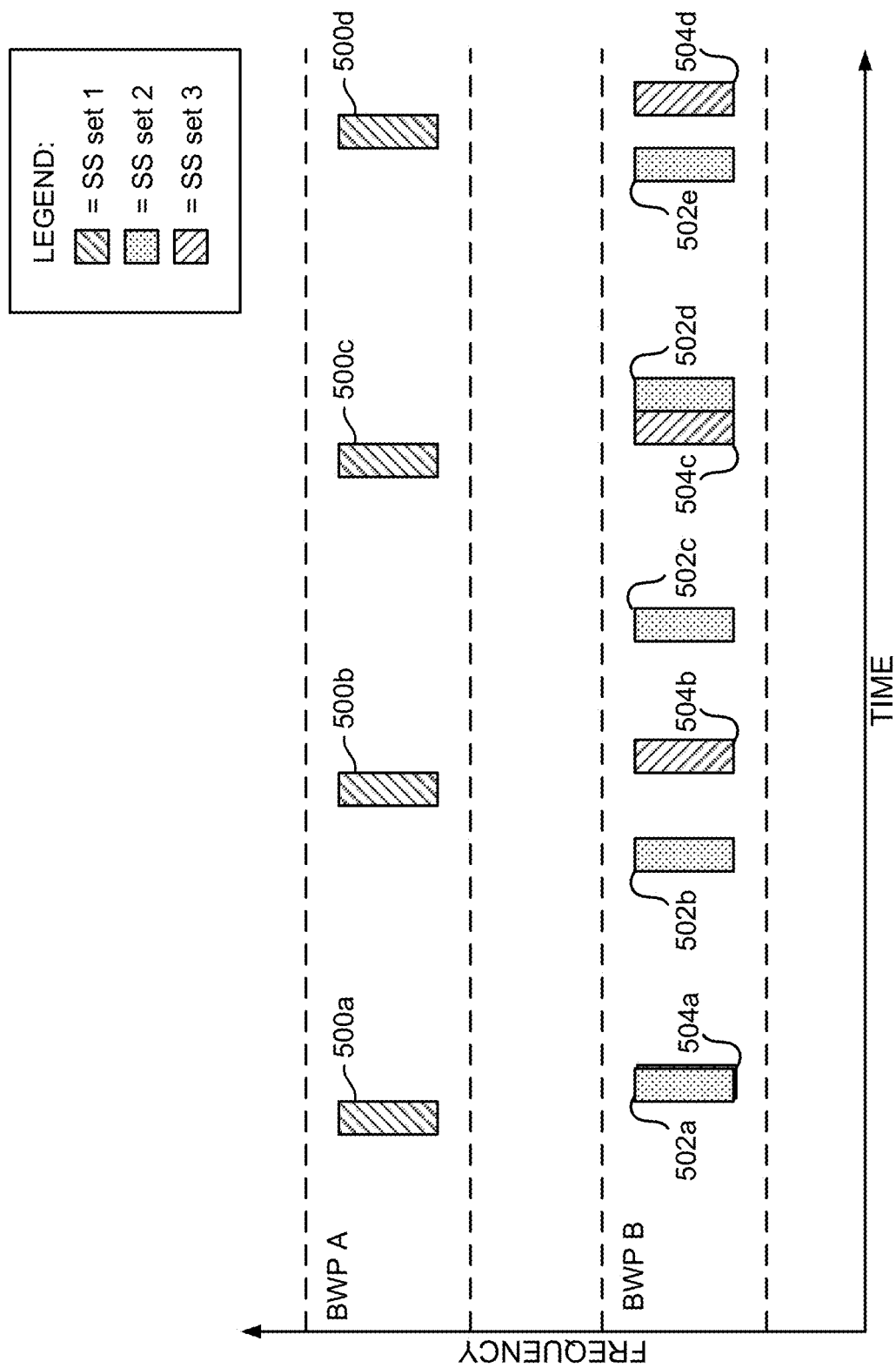
FIG. 5 is a simplified graph of frequency versus time, showing the relative locations of PDCCH monitoring occasions associated with different SS sets according to some aspects.

FIG. 5 is a simplified graph of frequency versus time, showing the relative locations of PDCCH monitoring occasions associated with different SS sets. In FIG. 5, two BWPs are shown, labeled BWP A and BWP B. BWP A includes PDCCH monitoring occasions 500*a*, 500*b*, 500*c*, and 500*d*, which are defined by SS set 1. BWP B includes PDCCH monitoring occasions 502*a*, 502*b*, 502*c*, 502*d*, and 502*e*, which are defined by SS set 2. BWP B also includes PDCCH monitoring occasions 504*a*, 504*b*, 504*c*, and 504*d*, which are defined by SS set 3. As can be seen in FIG. 5, each SS set may have its own periodicity and offset. For example, SS set 1 and SS set 3 have the same periodicity but different offsets, while SS set 1 and SS set 2 have different periodicities. FIG. 5 illustrates the point that PDCCH monitoring occasions from different SS sets, such as PDCCH monitoring occasion 502*a* and PDCCH monitoring occasion 504*a*, may overlap in time and frequency, e.g., they may have overlapping PDCCH candidates.

PDCCH monitoring accounts for a large portion—typically, more than half—of a UE's power consumption. For a class of UEs known as "reduced capability" UEs, the target requirement is that a battery should be able to power the UE for weeks or even years, and that the UE have very low duty cycle traffic. To achieve this target, a mechanism has been proposed to deactivate some, but not all, of the SS sets supported by the UE. Deactivation of an SS set means that the UE will not monitor for PDCCH resources within the monitoring occasions defined by the deactivated SS set. However, there is currently no defined mechanism by which a UE can activate a deactivated SS set.

Downlink Control Information (DCI) provides a user equipment (UE) with information such as physical layer resource allocation, power control commands, and hybrid automatic repeat request (HARQ) information for both uplink and downlink. DCI is transmitted on the Physical Downlink Control Channel (PDCCH), which must be continually monitored by the UE. A search space (SS) defines PDCCH monitoring occasions, which are locations in the time and frequency domains which the UE should monitor for PDCCH. Each SS is associated with a single aggregation level, e.g., the number of control channel elements (CCEs)/number of resources associated for each PDCCH.

An SS set defines search spaces for multiple aggregation levels. A maximum of ten SS sets can be configured per UE per bandwidth part (BWP). An SS set may be a common SS (CSS) set for scheduling broadcast data, UE group specific data, and limited scheduling of UE-specific data, or a UE-specific SS (USS) set for full scheduling functions of UE-specific data. Each SS set defines a periodicity (e.g., the number of slots in the period), an offset in the slot, and starting symbols of the PDCCH monitoring occasions within the slot. PDCCH monitoring occasions do not cross slot boundaries. A UE is typically provisioned with multiple SS sets by the network.

PDCCH monitoring accounts for a large portion—typically, more than half—of a UE's power consumption. For a class of UEs known as "reduced capability" UEs, the target requirement is that a battery should be able to power the UE for weeks or even years, and that the UE have very low duty cycle traffic. To achieve this target, a mechanism has been proposed to deactivate some, but not all, of the SS sets supported by the UE. Deactivation of an SS set means that the UE will not monitor for PDCCH resources within the monitoring occasions defined by the deactivated SS set. However, there is currently no defined mechanism by which a UE can activate a deactivated SS set.

To overcome the technical disadvantages of conventional systems and methods described above, mechanisms by which a UE 104 may activate a deactivated SS set are provided.

Figure 6:
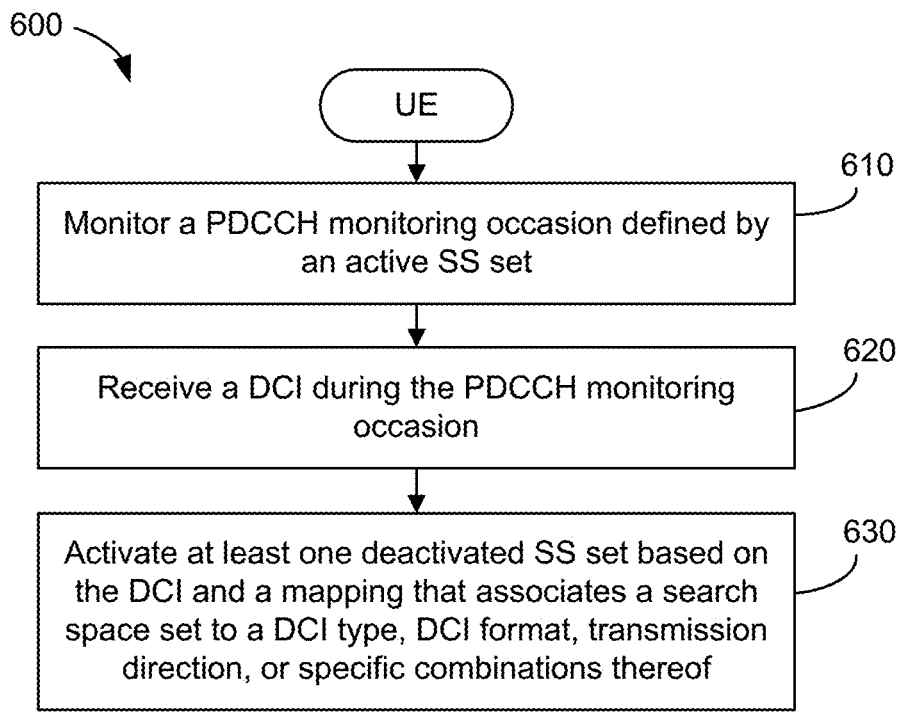
FIG. 6 is a flowchart of an example process associated with search space set activation according to some aspects.

FIG. 6 is a flowchart of an example process 600 associated with search space set activation according to some aspects of the disclosure. In some implementations, one or more process blocks of FIG. 6 may be performed by a UE (e.g., UE 104). In some implementations, one or more process blocks of FIG. 6 may be performed by another device or a group of devices separate from or including the UE. Additionally, or alternatively, one or more process blocks of FIG. 6 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 600.

As shown in FIG. 6, process 600 may include monitoring a PDCCH monitoring occasion defined by an active SS set (block 610). Means for performing the operation of block 610 may include the WWAN transceiver(s) 310 of the UE 302. For example, the UE 302 may monitor the PDCCH monitoring occasion defined by an active SS set, using the receiver(s) 312. It will be understood that the UE 104 may monitor multiple PDCCH monitoring occasions defined by an active SS set or by multiple active SS sets.

As further shown in FIG. 6, process 600 may include receiving, during the PDCCH monitoring occasion, a DCI (block 620). Means for performing the operation of block 620 may include the WWAN transceiver(s) 310 of the UE 302. For example, the UE 302 may receive the DCI using the receiver(s) 312.

As further shown in FIG. 6, process 600 may include activating at least one deactivated SS set based on the DCI and a mapping that associates an SS set to a DCI type, DCI format, transmission direction, or specific combinations thereof (block 630). Means for performing the operation of block 630 may include the processor(s) 332, memory 340, and WWAN transceiver(s) 310 of the UE 302. For example, the processor(s) 332 of the UE 302 may activate at least one deactivated SS set based on the DCI received by the receiver(s) 312 and a mapping that is stored in the memory 340. In some aspects, activating at least one deactivated SS set comprises activating a plurality of deactivated SS sets. In some aspects, the DCI type comprises a data scheduling DCI, a sounding reference signal (SRS) request DCI, a channel state information (CSI) request DCI, a transmit power control DCI, a slot format indication DCI, a DCI for uplink, a DCI for downlink and/or a DCI for both uplink and downlink.

In some aspects, at least a portion of the mapping is statically defined, semi-statically or dynamically provisioned, or provided to the UE via radio resource control (RRC) or medium access control (MAC) control element (MAC-CE). In some aspects, the mapping defines at least one triggering condition under which a deactivated SS set is to be activated. In some aspects, the mapping associates one or more source SS sets to one or more target SS sets wherein the UE maintains PDCCH monitoring in one or more of the source SS sets when PDCCH monitoring in one or more of the target SS sets is deactivated. In some aspects, at least one of the one or more source SS sets comprises a common SS (CSS) set or a UE-specific SS (USS). In some aspects, the mapping identifies source SS sets and target SS sets by their respective SS set identifiers (IDs).

In some aspects, receiving a DCI on a source SS set triggers activation of a deactivated target SS set according to the mapping. In some aspects, the mapping comprises a plurality of source SS sets, each source SS set being associated with at least one target SS set. In some aspects, at least one of the one or more source SS sets is associated with a plurality of target SS sets according to the mapping. In some aspects, at least one of the one or more target SS sets is associated with a plurality of source SS sets according to the mapping.

In some aspects, activating a deactivated SS set based on the DCI and the mapping comprises activating the deactivated SS set after a predefined delay after receiving the DCI. In some aspects, the predefined delay is based on a DCI type and/or DCI format of the DCI received. In some aspects, the predefined delay has a zero duration. In some aspects, the predefined delay has a non-zero duration. In some aspects, a plurality of DCIs are received, wherein each of the plurality of DCIs is associated with its own predefined delay value, and wherein the deactivated SS set is activated at the earliest activation time instant as determined by delay values associated with the plurality of DCIs.

In some aspects, the PDCCH monitoring occasion is part of a first source SS set that is associated with a first target SS set, the PDCCH monitoring occasion is also part of a second source SS set that is associated with a second target SS set different from the first target SS set, receiving the DCI during the PDCCH monitoring occasion comprises receiving a DCI in a DCI format that is associated with the first source SS set and the second source SS set, and activating a deactivated SS set comprises activating the first target SS set and the second target SS set.

In some aspects, process 600 includes monitoring all of the PDCCH monitoring occasions defined by the activated SS set or a subset less than all of the PDCCH monitoring occasions defined by the activated SS set.

Process 600 may include additional implementations, such as any single implementation or any combination of implementations described below and/or in connection with one or more other processes described elsewhere herein. Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
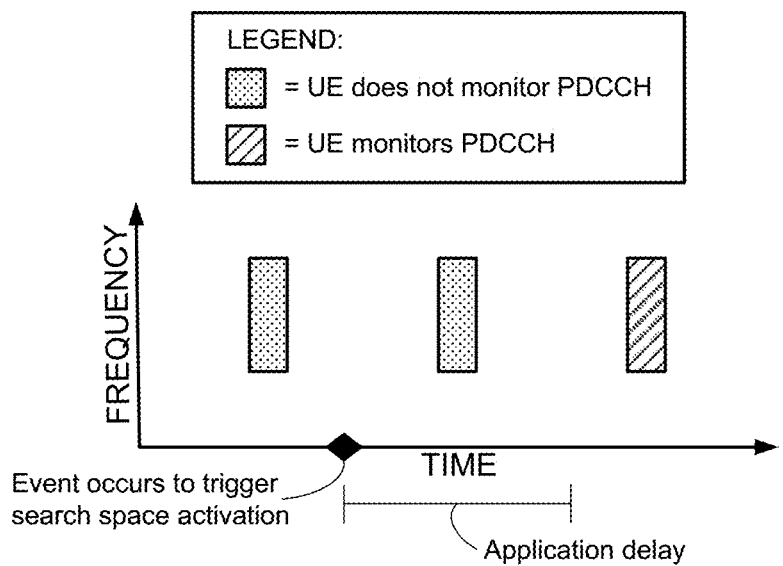
FIG. 7 illustrates activating the deactivated SS set after a predefined delay after receiving the DCI according to some aspects.

FIG. 7 illustrates activating the deactivated SS set after a predefined delay after receiving the DCI according to some aspects of the disclosure. According to some aspects, the predefined delay is based on the DCI type and/or DCI format of the DCI received. According to some aspects, the predefined delay has a zero duration. According to some aspects, a plurality of DCIs are received, wherein each of the plurality of DCIs is associated with its own predefined delay value, and wherein the deactivated SS set is activated at the earliest activation time instant associated with the plurality of DCIs.

According to some aspects, activating a deactivated SS set based on the DCI includes activating a deactivated search space set based on a DCI type, DCI format, transmission direction, or some combination of the above. According to some aspects, the DCI type includes a data scheduling DCI, a sounding reference signal (SRS) request DCI, a channel state information (CSI) request DCI, a transmit power control DCI, a slot format indication DCI, a DCI for uplink, a DCI for downlink and/or a DCI for both uplink and downlink. For example, a UE may apply different time duration values depending on the DCI type: an SRS request DCI may incur a longer application delay if the network wants to first receive and process the requested SRS to obtain channel status, while a data scheduling DCI may incur a shorter delay during which the UE and the network prepare for the data exchange.

According to some aspects, activating a deactivated SS set based on the DCI type and/or DCI format includes activating deactivated SS sets based on specific combinations of DCI type and DCI format. According to some aspects, activating a deactivated SS set based on the DCI includes activating a deactivated SS set based on one or more triggering rules that define at least one triggering condition under which a deactivated SS set is to be activated. In scenarios where there is only one DCI format to be received for activating a deactivated SS set, the DCI format does not need to be explicitly determined, nor does it need to be explicitly specified as part of a triggering rule. According to some aspects, the one or more triggering rules are statically defined. According to some aspects, the one or more triggering rules are semi-statically or dynamically provisioned. According to some aspects, the one or more triggering rules are provided to the UE via radio resource control (RRC) or medium access control (MAC) control element (MAC-CE).

According to some aspects, the UE maintains PDCCH monitoring in one or more source SS sets when PDCCH monitoring is one or more target SS sets is deactivated, according to a mapping that associates one or more source SS sets to one or more target SS sets. Since activation of a deactivated SS set is triggered at least in part by receiving a DCI, the UE maintains at least one active SS set for that purpose. Thus, according to some aspects, activating a deactivated SS set based on the DCI includes activating a deactivated SS set according to a mapping, which may be defined by one or more mapping rules, each mapping rule associating a source SS set to at least one target SS set such that activating the at least one target SS set is triggered by receiving the DCI format on the source SS set. According to some aspects, the source SS set is a common SS (CSS) set or a UE-specific SS (USS). According to some aspects, the mapping identifies source SS sets and target SS sets by their respective SS set identifiers (IDs).

Figure 8:
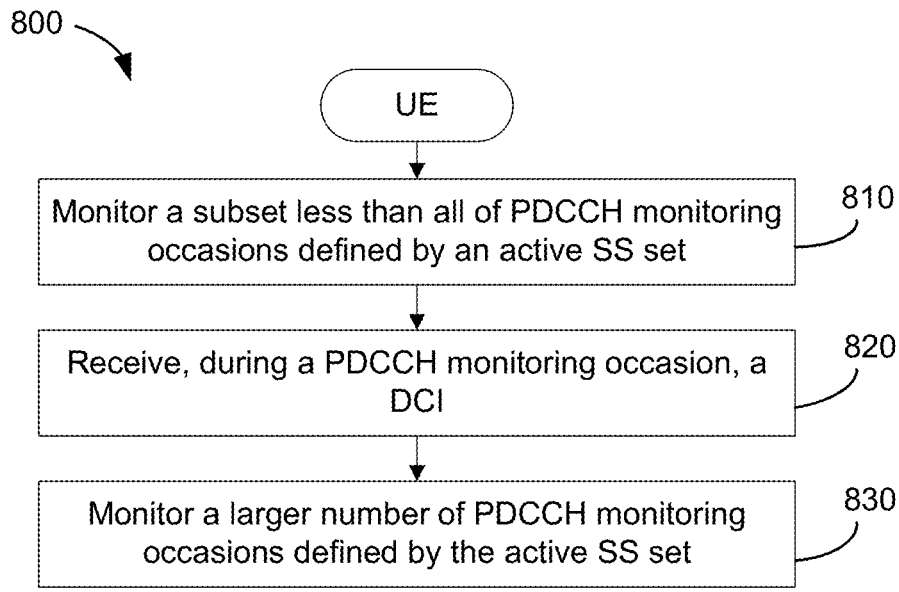
FIG. 8 is a flowchart of another example process associated with search space set activation according to some aspects.

FIG. 8 is a flowchart of an example process 800 associated with search space set activation according to some aspects of the disclosure. In some implementations, one or more process blocks of FIG. 8 may be performed by a UE (e.g., UE 104). In some implementations, one or more process blocks of FIG. 8 may be performed by another device or a group of devices separate from or including the UE. Additionally, or alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 800.

As shown in FIG. 8, process 800 may include monitoring a subset less than all of PDCCH monitoring occasions defined by an active SS set (block 810). Means for performing the operation of block 810 may include the WWAN transceiver(s) 310 of the UE 302. For example, the UE 302 may monitor a subset less than all of PDCCH monitoring occasions defined by an active SS set, using the receiver(s) 312. In some aspects, monitoring the subset less than all of the PDCCH monitoring occasions defined by the active SS set comprises monitoring according to a monitoring period.

As further shown in FIG. 8, process 800 may include receiving, during a PDCCH monitoring occasion, a DCI (block 820). Means for performing the operation of block 820 may include the WWAN transceiver(s) 310 of the UE 302. For example, the UE 302 may receive the DCI, using the receiver(s) 312.

As further shown in FIG. 8, process 800 may include monitoring a larger number of PDCCH monitoring occasions defined by the active SS set (block 830). Means for performing the operation of block 830 may include the WWAN transceiver(s) 310 of the UE 302. For example, the UE 302 may monitor a larger number of PDCCH monitoring occasions defined by the active SS set, using the receiver(s) 312. In some aspects, monitoring a larger number of PDCCH monitoring occasions defined by the active SS set comprises monitoring all of the PDCCH monitoring occasions defined by the active SS set.

In some aspects, process 800 includes activating at least one deactivated SS set based on the DCI and a mapping that associates an SS set to a DCI type, DCI format, transmission direction, or specific combinations thereof, or both.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
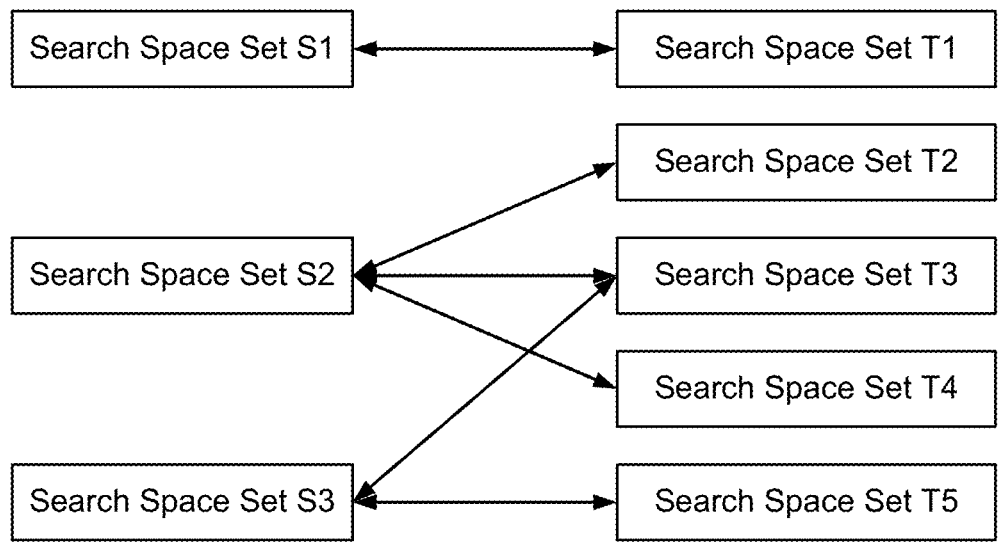
FIG. 9 illustrates an example mapping of source SS sets to target SS sets according to some aspects of the disclosure.

FIG. 9 illustrates an example mapping of source SS sets to target SS sets according to some aspects of the disclosure. In FIG. 9, source SS sets S1 through S3 are mapped to one or more target SS sets T1 through T5. In FIG. 9, for example, source SS set S1 is mapped to target SS set T1; source SS set S2 is mapped to target SS sets T2, T3, and T4; and source SS set S3 is mapped to target SS sets T3 and T5. FIG. 9 illustrates the point that a source SS set may be mapped to one target SS set (e.g., S1 is mapped to T1) or to more than one target SS set (e.g., S2 is mapped to T2, T3, and T4). Likewise, more than one source SS set may be mapped to the same target SS set (e.g., S2 is mapped to T3 and S3 is mapped to T3). Using the example mapping shown in FIG. 9, if SS set T1 is deactivated, then SS set S1 may remain active (or may be activated).

Thus, according to some aspects, receiving a DCI on the source SS set triggers activation of the deactivated target SS set according to the mapping. According to some aspects, the mapping comprises multiple source SS sets, each source SS set being associated with at least one target SS set. According to some aspects, at least one of the one or more source SS sets is associated with multiple target SS sets according to the mapping. According to some aspects, at least one of the one or more target SS sets is associated with multiple source SS sets according to the mapping. According to some aspects, the source SS set is implied in at least one of the mapping rules. According to some aspects, the implied source SS set includes a SS set having the lowest ID number or having the highest ID number. In some aspects, the SS set with ID=zero may be excluded. According to some aspects, the implied source SS set includes all SS sets having a specified trigger rule. Alternatively, the network may guarantee that the DCI format is configured for the selected SS set (e.g., the lowest or highest ID in all SS sets). Again, using the example shown in FIG. 9, receiving a DCI in SS set S1 would trigger activation of deactivated SS set T1, while receiving a DCI in SS set S3 would trigger activation of deactivated SS sets T3 and T5. In some aspects, detecting any DCI in a source SS set would trigger activation of a target SS set according to the mapping. In other aspects, activation of a target SS set occurs only if the DCI in the source SS set meets certain criteria, such as DCI type, DCI format, whether the DCI is for UL, DL, or both, other criteria, or some combination of the above.

According to some aspects, the method also includes receiving a plurality of DCIs during the PDCCH monitoring occasion, wherein activating the deactivated SS set based on the DCI includes activating the deactivated SS sets corresponding to each of the plurality of DCIs. For example, a PDCCH in one SS set may collide with a PDCCH in another SS set (i.e., the two PDCCHs may occupy the same control channel elements (CCEs)). In this scenario, the UE cannot determine in which SS set the network transmitted the PDCCH with the DCI format. This may occur, for example, if the network configures the same DCI format for data scheduling in two SS sets with different periodicities and overlapping occasions to schedule two types of traffic with different underlying patterns (e.g., one for sparse traffic, one for dense traffic). An example of such an overlap is shown in FIG. 5, as the overlapping PDCCH monitoring occasions 502a (from SS set 2) and 504a (from SS set 3). In some aspects, the UE would activate both the target SS set(s) to which source SS set 2 is mapped and the target SS set(s) to which source SS set 3 is mapped. In some aspects, one of the overlapping SS sets may not be mapped to a target SS set, in which case only one target SS set would be activated. More specifically, in some aspects, a PDCCH monitoring occasion is part of a first source SS set that is associated with a first target SS set and the PDCCH monitoring occasion is also part of a second source SS set that is associated with a second target SS set different from the first target SS set. The UE receives, during the PDCCH monitoring occasion, a DCI in a DCI format that is associated with the first source SS set and the second source SS set and activates both the first target SS set(s) and the second target SS set(s).

Alternatively, in other aspects, the network may avoid configuring such a situation entirely so that the problem is moot.

One intended benefit of deactivating SS sets is to reduce power consumption of the UE 104, yet some SS sets may remain active in order to detect the DCIs that may trigger activation of the deactivated SS sets. If the SS set(s) remaining active have dense PDCCH monitoring occasions in time, the UE 104 may not be able to reduce its power consumption very much. To address this problem, the UE 104 could continue monitoring the active SS set(s), but less often than usual. Thus, according to some aspects, monitoring the PDCCH monitoring occasion defined by an active SS set for activating a deactivated SS set includes monitoring a subset less than all of the PDCCH monitoring occasions defined by the active SS set. According to some aspects, monitoring a subset less than all of the PDCCH monitoring occasions defined by the active SS set includes monitoring according to a monitoring period. According to some aspects, the monitoring period is not less than three slots in duration. According to some aspects, monitoring the PDCCH monitoring occasion defined by an active SS set for activating a deactivated SS set includes network configuring a monitoring period of the active SS set not smaller than a threshold value.

The methods and systems disclosed herein provide at least the following technical advantages: a UE can restart PDCCH monitoring in deactivated search spaces where PDCCH monitoring has been stopped, which is useful, for example, where there is data to be exchanged between the UE and the network; the trigger for activating deactivated search spaces may be conditioned upon various criteria, such as DCI type, DCI format, etc.; a delay may be defined between the triggering event and the time that the UE restarts monitoring a formerly deactivated search space, and a different delay may be chosen for different DCI types, formats, etc.; and mapping of source SS sets to target SS sets provides an additional level of control over, and granularity of, the activation process.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a UE, the method comprising: monitoring a PDCCH monitoring occasion defined by an active SS set; receiving, during the PDCCH monitoring occasion, a DCI; and activating at least one deactivated SS set based on the DCI and a mapping that associates an SS set to a DCI type, DCI format, transmission direction, or combinations thereof.

Clause 2. The method of clause 1, further comprising monitoring all of the PDCCH monitoring occasions defined by the activated SS set.

Clause 3. The method of clause 1, further comprising monitoring a subset less than all of the PDCCH monitoring occasions defined by the activated SS set.

Clause 4. The method of any of clauses 1 to 3, wherein the DCI type comprises at least one of a data scheduling DCI, an SRS request DCI, a CSI request DCI, a transmit power control DCI, a slot format indication DCI, a DCI for uplink, a DCI for downlink, or a DCI for both uplink and downlink.

Clause 5. The method of clause 4, wherein at least a portion of the mapping is statically defined, semi-statically or dynamically provisioned, or provided to the UE via RRC or MAC-CE.

Clause 6. The method of any of clauses 1 to 5, wherein activating a deactivated SS set based on the DCI and the mapping comprises activating the deactivated SS set after a predefined delay after receiving the DCI.

Clause 7. The method of clause 6, wherein the predefined delay is based on a DCI type and/or DCI format of the DCI received.

Clause 8. The method of any of clauses 6 to 7, wherein the predefined delay has a zero duration.

Clause 9. The method of any of clauses 6 to 7, wherein the predefined delay has a non-zero duration.

Clause 10. The method of any of clauses 6 to 9, wherein a plurality of DCIs are received, wherein each of the plurality of DCIs is associated with its own predefined delay value, and wherein the deactivated SS set is activated at the earliest activation time instant as determined by delay values associated with the plurality of DCIs.

Clause 11. The method of any of clauses 1 to 10, wherein activating at least one deactivated SS set comprises activating a plurality of deactivated SS sets.

Clause 12. The method of any of clauses 1 to 11, wherein the mapping defines at least one triggering condition under which a deactivated SS set is to be activated.

Clause 13. The method of any of clauses 1 to 12, wherein the mapping associates one or more source SS sets to one or more target SS sets wherein the UE maintains PDCCH monitoring in one or more of the source SS sets when PDCCH monitoring in one or more of the target SS sets is deactivated.

Clause 14. The method of clause 13, wherein at least one of the one or more source SS sets comprises a common SS (CSS) set or a UE-specific SS (USS).

Clause 15. The method of any of clauses 13 to 14, wherein the mapping identifies source SS sets and target SS sets by their respective SS set IDs.

Clause 16. The method of any of clauses 13 to 15, wherein receiving a DCI on a source SS set triggers activation of a deactivated target SS set according to the mapping.

Clause 17. The method of any of clauses 13 to 16, wherein the mapping comprises a plurality of source SS sets, each source SS set being associated with at least one target SS set.

Clause 18. The method of any of clauses 13 to 17, wherein at least one of the one or more source SS sets is associated with a plurality of target SS sets according to the mapping.

Clause 19. The method of any of clauses 13 to 18, wherein at least one of the one or more target SS sets is associated with a plurality of source SS sets according to the mapping.

Clause 20. The method of any of clauses 13 to 19, wherein: the PDCCH monitoring occasion is part of a first source SS set that is associated with a first target SS set; the PDCCH monitoring occasion is also part of a second source SS set that is associated with a second target SS set different from the first target SS set; receiving the DCI during the PDCCH monitoring occasion comprises receiving a DCI in a DCI format that is associated with the first source SS set and the second source SS set; and activating a deactivated SS set comprises activating the first target SS set and the second target SS set.

Clause 21. A method of wireless communication performed by a UE, the method comprising: monitoring a subset less than all of PDCCH monitoring occasions defined by an active SS set; receiving, during a PDCCH monitoring occasion, a DCI; and monitoring a larger number of PDCCH monitoring occasions defined by the active SS set.

Clause 22. The method of clause 21 wherein monitoring the subset less than all of the PDCCH monitoring occasions defined by the active SS set comprises monitoring according to a monitoring period.

Clause 23. The method of any of clauses 21 to 22, wherein monitoring a larger number of PDCCH monitoring occasions defined by the active SS set comprises monitoring all of the PDCCH monitoring occasions defined by the active SS set.

Clause 24. The method of any of clauses 21 to 23, further comprising activating at least one deactivated SS set based on the DCI and a mapping that associates an SS set to a DCI type, DCI format, transmission direction, or specific combinations thereof, or both.

Clause 25. A UE, comprising: a memory; at least one transceiver; and at least one processor communicatively coupled to the memory and the at least one transceiver, the at least one processor configured to: monitor a PDCCH monitoring occasion defined by an active SS set; receive, via the at least one transceiver, during the PDCCH monitoring occasion, a DCI; and activate at least one deactivated SS set based on the DCI and a mapping that associates an SS set to a DCI type, DCI format, transmission direction, or combinations thereof.

Clause 26. The UE of clause 25, wherein the at least one processor is further configured to monitor all of the PDCCH monitoring occasions defined by the activated SS set.

Clause 27. The UE of clause 25, wherein the at least one processor is further configured to monitor a subset less than all of the PDCCH monitoring occasions defined by the activated SS set Clause 28. The UE of any of clauses 25 to 27, wherein the DCI type comprises at least one of a data scheduling DCI, an SRS request DCI, a CSI request DCI, a transmit power control DCI, a slot format indication DCI, a DCI for uplink, a DCI for downlink, or a DCI for both uplink and downlink.

Clause 29. The UE of clause 28, wherein at least a portion of the mapping is statically defined, semi-statically or dynamically provisioned, or provided to the UE via RRC or MAC-CE.

Clause 30. The UE of any of clauses 25 to 29, wherein, to activate a deactivated SS set based on the DCI and the mapping, the at least one processor is configured to activate the deactivated SS set after a predefined delay after receiving the DCI.

Clause 31. The UE of clause 30, wherein the predefined delay is based on a DCI type and/or DCI format of the DCI received.

Clause 32. The UE of any of clauses 30 to 31, wherein the predefined delay has a zero duration.

Clause 33. The UE of any of clauses 30 to 31, wherein the predefined delay has a non-zero duration.

Clause 34. The UE of any of clauses 30 to 33, wherein a plurality of DCIs are received, wherein each of the plurality of DCIs is associated with its own predefined delay value, and wherein the deactivated SS set is activated at the earliest activation time instant as determined by delay values associated with the plurality of DCIs.

Clause 35. The UE of any of clauses 25 to 34, wherein, to activate at least one deactivated SS set, the at least one processor is configured to activate a plurality of deactivated SS sets.

Clause 36. The UE of any of clauses 25 to 35, wherein the mapping defines at least one triggering condition under which a deactivated SS set is to be activated.

Clause 37. The UE of any of clauses 25 to 36, wherein the mapping associates one or more source SS sets to one or more target SS sets wherein the UE maintains PDCCH monitoring in one or more of the source SS sets when PDCCH monitoring in one or more of the target SS sets is deactivated.

Clause 38. The UE of clause 37, wherein at least one of the one or more source SS sets comprises a CSS set or a USS.

Clause 39. The UE of any of clauses 37 to 38, wherein the mapping identifies source SS sets and target SS sets by their respective SS set IDs.

Clause 40. The UE of any of clauses 37 to 39, wherein receiving a DCI on a source SS set triggers activation of a deactivated target SS set according to the mapping.

Clause 41. The UE of any of clauses 37 to 40, wherein the mapping comprises a plurality of source SS sets, each source SS set being associated with at least one target SS set.

Clause 42. The UE of any of clauses 37 to 41, wherein at least one of the one or more source SS sets is associated with a plurality of target SS sets according to the mapping.

Clause 43. The UE of any of clauses 37 to 42, wherein at least one of the one or more target SS sets is associated with a plurality of source SS sets according to the mapping.

Clause 44. The UE of any of clauses 37 to 43, wherein: the PDCCH monitoring occasion is part of a first source SS set that is associated with a first target SS set; the PDCCH monitoring occasion is also part of a second source SS set that is associated with a second target SS set different from the first target SS set; receiving the DCI during the PDCCH monitoring occasion comprises receiving a DCI in a DCI format that is associated with the first source SS set and the second source SS set; and activating a deactivated SS set comprises activating the first target SS set and the second target SS set.

Clause 45. A UE, comprising: a memory; at least one transceiver; and at least one processor communicatively coupled to the memory and the at least one transceiver, the at least one processor configured to: monitor a subset less than all of PDCCH monitoring occasions defined by an active SS set; receive, via the at least one transceiver, during a PDCCH monitoring occasion, a DCI; and monitor a larger number of PDCCH monitoring occasions defined by the active SS set.

Clause 46. The UE of clause 45, The method of clause 45 wherein monitoring the subset less than all of the PDCCH monitoring occasions defined by the active SS set comprises monitoring according to a monitoring period.

Clause 47. The UE of any of clauses 45 to 46, wherein, to monitor a larger number of PDCCH monitoring occasions defined by the active SS set, the at least one processor is configured to monitor all of the PDCCH monitoring occasions defined by the active SS set.

Clause 48. The UE of any of clauses 45 to 47, wherein the at least one processor is further configured to activate at least one deactivated SS set based on the DCI and a mapping that associates an SS set to a DCI type, DCI format, transmission direction, or specific combinations thereof, or both.

Clause 49. A UE, comprising means for monitoring a PDCCH monitoring occasion defined by an active SS set; means for receiving, during the PDCCH monitoring occasion, a DCI; and means for activating at least one deactivated SS set based on the DCI and a mapping that associates an SS set to a DCI type, DCI format, transmission direction, or combinations thereof.

Clause 50. The UE of clause 49, further comprising means for monitoring all of the PDCCH monitoring occasions defined by the activated SS set.

Clause 51. The UE of clause 49, further comprising means for monitoring a subset less than all of the PDCCH monitoring occasions defined by the activated SS set.

Clause 52. The UE of any of clauses 49 to 51, wherein the DCI type comprises at least one of a data scheduling DCI, an SRS request DCI, a CSI request DCI, a transmit power control DCI, a slot format indication DCI, a DCI for uplink, a DCI for downlink, or a DCI for both uplink and downlink.

Clause 53. The UE of clause 52, wherein at least a portion of the mapping is statically defined, semi-statically or dynamically provisioned, or provided to the UE via RRC or MAC-CE.

Clause 54. The UE of any of clauses 49 to 53, wherein the means for activating a deactivated SS set based on the DCI and the mapping comprises means for activating the deactivated SS set after a predefined delay after receiving the DCI.

Clause 55. The UE of clause 54, wherein the predefined delay is based on a DCI type and/or DCI format of the DCI received.

Clause 56. The UE of any of clauses 54 to 55, wherein the predefined delay has a zero duration.

Clause 57. The UE of any of clauses 54 to 55, wherein the predefined delay has a non-zero duration.

Clause 58. The UE of any of clauses 54 to 57, wherein a plurality of DCIs are received, wherein each of the plurality of DCIs is associated with its own predefined delay value, and wherein the deactivated SS set is activated at the earliest activation time instant as determined by delay values associated with the plurality of DCIs.

Clause 59. The UE of any of clauses 49 to 58, wherein the means for activating at least one deactivated SS set comprises means for activating a plurality of deactivated SS sets.

Clause 60. The UE of any of clauses 49 to 59, wherein the mapping defines at least one triggering condition under which a deactivated SS set is to be activated.

Clause 61. The UE of any of clauses 49 to 60, wherein the mapping associates one or more source SS sets to one or more target SS sets wherein the UE maintains PDCCH monitoring in one or more of the source SS sets when PDCCH monitoring in one or more of the target SS sets is deactivated.

Clause 62. The UE of clause 61, wherein at least one of the one or more source SS sets comprises a CSS set or a USS.

Clause 63. The UE of any of clauses 61 to 62, wherein the mapping identifies source SS sets and target SS sets by their respective SS set IDs.

Clause 64. The UE of any of clauses 61 to 63, wherein receiving a DCI on a source SS set triggers activation of a deactivated target SS set according to the mapping.

Clause 65. The UE of any of clauses 61 to 64, wherein the mapping comprises a plurality of source SS sets, each source SS set being associated with at least one target SS set.

Clause 66. The UE of any of clauses 61 to 65, wherein at least one of the one or more source SS sets is associated with a plurality of target SS sets according to the mapping.

Clause 67. The UE of any of clauses 61 to 66, wherein at least one of the one or more target SS sets is associated with a plurality of source SS sets according to the mapping.

Clause 68. The UE of any of clauses 61 to 67, wherein: the PDCCH monitoring occasion is part of a first source SS set that is associated with a first target SS set; the PDCCH monitoring occasion is also part of a second source SS set that is associated with a second target SS set different from the first target SS set; receiving the DCI during the PDCCH monitoring occasion comprises receiving a DCI in a DCI format that is associated with the first source SS set and the second source SS set; and activating a deactivated SS set comprises activating the first target SS set and the second target SS set.

Clause 69. A UE, comprising means for monitoring a subset less than all of PDCCH monitoring occasions defined by an active SS set; means for receiving, during a PDCCH monitoring occasion, a DCI; and means for monitoring a larger number of PDCCH monitoring occasions defined by the active SS set.

Clause 70. The UE of clause 69, wherein monitoring the subset less than all of the PDCCH monitoring occasions defined by the active SS set comprises monitoring according to a monitoring period.

Clause 71. The UE of any of clauses 69 to 70, wherein the means for monitoring a larger number of PDCCH monitoring occasions defined by the active SS set comprises means for monitoring all of the PDCCH monitoring occasions defined by the active SS set.

Clause 72. The UE of any of clauses 69 to 71, further comprising means for activating at least one deactivated SS set based on the DCI and a mapping that associates an SS set to a DCI type, DCI format, transmission direction, or combinations thereof.

Clause 73. A non-transitory computer-readable medium storing computer-executable instructions that, when executed by a UE, cause the UE to monitor a PDCCH monitoring occasion defined by an active SS set; receive, during the PDCCH monitoring occasion, a DCI; and activate at least one deactivated SS set based on the DCI and a mapping that associates an SS set to a DCI type, DCI format, transmission direction, or combinations thereof.

Clause 74. The non-transitory computer-readable medium of clause 73, further comprising instructions that, when executed by the UE, further cause the UE to monitor all of the PDCCH monitoring occasions defined by the activated SS set.

Clause 75. The non-transitory computer-readable medium of clause 73, further comprising instructions that, when executed by the UE, further cause the UE to monitor a subset less than all of the PDCCH monitoring occasions defined by the activated SS set.

Clause 76. The non-transitory computer-readable medium of any of clauses 73 to 75, wherein the DCI type comprises at least one of a data scheduling DCI, an SRS request DCI, a CSI request DCI, a transmit power control DCI, a slot format indication DCI, a DCI for uplink, a DCI for downlink, or a DCI for both uplink and downlink.

Clause 77. The non-transitory computer-readable medium of clause 76, wherein at least a portion of the mapping is statically defined, semi-statically or dynamically provisioned, or provided to the UE via RRC or MAC-CE.

Clause 78. The non-transitory computer-readable medium of any of clauses 73 to 77, wherein the computer-executable instructions that, when executed by the UE, cause the UE to activate a deactivated SS set based on the DCI and the mapping comprise computer-executable instructions that, when executed by the UE, cause the UE to activate the deactivated SS set after a predefined delay after receiving the DCI.

Clause 79. The non-transitory computer-readable medium of clause 78, wherein the predefined delay is based on a DCI type and/or DCI format of the DCI received.

Clause 80. The non-transitory computer-readable medium of any of clauses 78 to 79, wherein the predefined delay has a zero duration.

Clause 81. The non-transitory computer-readable medium of any of clauses 78 to 79, wherein the predefined delay has a non-zero duration.

Clause 82. The non-transitory computer-readable medium of any of clauses 78 to 81, wherein a plurality of DCIs are received, wherein each of the plurality of DCIs is associated with its own predefined delay value, and wherein the deactivated SS set is activated at the earliest activation time instant as determined by delay values associated with the plurality of DCIs.

Clause 83. The non-transitory computer-readable medium of any of clauses 73 to 82, wherein the computer-executable instructions that, when executed by the UE, cause the UE to activate at least one deactivated SS set comprise computer-executable instructions that, when executed by the UE, cause the UE to activate a plurality of deactivated SS sets.

Clause 84. The non-transitory computer-readable medium of any of clauses 73 to 83, wherein the mapping defines at least one triggering condition under which a deactivated SS set is to be activated.

Clause 85. The non-transitory computer-readable medium of any of clauses 73 to 84, wherein the mapping associates one or more source SS sets to one or more target SS sets wherein the UE maintains PDCCH monitoring in one or more of the source SS sets when PDCCH monitoring in one or more of the target SS sets is deactivated.

Clause 86. The non-transitory computer-readable medium of clause 85, wherein at least one of the one or more source SS sets comprises a CSS set or a USS.

Clause 87. The non-transitory computer-readable medium of any of clauses 85 to 86, wherein the mapping identifies source SS sets and target SS sets by their respective SS set IDs.

Clause 88. The non-transitory computer-readable medium of any of clauses 85 to 87, wherein receiving a DCI on a source SS set triggers activation of a deactivated target SS set according to the mapping.

Clause 89. The non-transitory computer-readable medium of any of clauses 85 to 88, wherein the mapping comprises a plurality of source SS sets, each source SS set being associated with at least one target SS set.

Clause 90. The non-transitory computer-readable medium of any of clauses 85 to 89, wherein at least one of the one or more source SS sets is associated with a plurality of target SS sets according to the mapping.

Clause 91. The non-transitory computer-readable medium of any of clauses 85 to 90, wherein at least one of the one or more target SS sets is associated with a plurality of source SS sets according to the mapping.

Clause 92. The non-transitory computer-readable medium of any of clauses 85 to 91, wherein: the PDCCH monitoring occasion is part of a first source SS set that is associated with a first target SS set; the PDCCH monitoring occasion is also part of a second source SS set that is associated with a second target SS set different from the first target SS set; receiving the DCI during the PDCCH monitoring occasion comprises receiving a DCI in a DCI format that is associated with the first source SS set and the second source SS set; and activating a deactivated SS set comprises activating the first target SS set and the second target SS set.

Clause 93. A non-transitory computer-readable medium storing computer-executable instructions that, when executed by a UE, cause the UE to monitor a subset less than all of PDCCH monitoring occasions defined by an active SS set; receive, during a PDCCH monitoring occasion, a DCI; and monitor a larger number of PDCCH monitoring occasions defined by the active SS set.

Clause 94. The non-transitory computer-readable medium of clause 93, wherein monitoring the subset less than all of the PDCCH monitoring occasions defined by the active SS set comprises monitoring according to a monitoring period.

Clause 95. The non-transitory computer-readable medium of any of clauses 93 to 94, wherein the computer-executable instructions that, when executed by the UE, cause the UE to monitor a larger number of PDCCH monitoring occasions defined by the active SS set comprise computer-executable instructions that, when executed by the UE, cause the UE to monitor all of the PDCCH monitoring occasions defined by the active SS set.

Clause 96. The non-transitory computer-readable medium of any of clauses 93 to 95, further comprising instructions that, when executed by the UE, further cause the UE to activate at least one deactivated SS set based on the DCI and a mapping that associates an SS set to a DCI type, DCI format, transmission direction, or combinations thereof.

Clause 97. An apparatus comprising a memory, a transceiver, and a processor communicatively coupled to the memory and the transceiver, the memory, the transceiver, and the processor configured to perform a method according to any of clauses 1 to 24.

Clause 98. An apparatus comprising means for performing a method according to any of clauses 1 to 24.

Clause 99. A non-transitory computer-readable medium storing computer-executable instructions, the computer-executable comprising at least one instruction for causing a computer or processor to perform a method according to any of clauses 1 to 24.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   monitoring a physical downlink control channel (PDCCH) monitoring occasion defined by an active search space (S S) set;
   receiving, during the PDCCH monitoring occasion, a downlink control information (DCI);
   activating at least one deactivated SS set based on the DCI and a mapping that associates an SS set to a DCI type, DCI format, transmission direction, or combinations thereof; and
   wherein the DCI type comprises at least one of a data scheduling DCI, a sounding reference signal (SRS) request DCI, a channel state information (CSI) request DCI, a transmit power control DCI, a slot format indication DCI, a DCI for uplink, a DCI for downlink, or a DCI for both uplink and downlink.

2. The method of claim 1, further comprising monitoring all of the PDCCH monitoring occasions defined by the activated SS set.

3. The method of claim 1, further comprising monitoring a subset less than all of the PDCCH monitoring occasions defined by the activated SS set.

4. The method of claim 1, wherein at least a portion of the mapping is statically defined, semi-statically or dynamically provisioned, or provided to the UE via radio resource control (RRC) or medium access control (MAC) control element (MAC-CE).

5. A method of wireless communication performed by a user equipment (UE), the method comprising:
   monitoring a physical downlink control channel (PDCCH) monitoring occasion defined by an active search space (SS) set;
   receiving, during the PDCCH monitoring occasion, a downlink control information (DCI);
   activating at least one deactivated SS set based on the DCI and a mapping that associates an SS set to a DCI type, DCI format, transmission direction, or combinations thereof; and
   wherein activating a deactivated SS set based on the DCI and the mapping comprises activating the deactivated SS set after a predefined delay after receiving the DCI.

6. The method of claim 5, wherein the predefined delay is based on a DCI type of the DCI received, a DCI format of the DCI received, or a combination thereof.

7. The method of claim 5, wherein the predefined delay has a zero duration.

8. The method of claim 5, wherein the predefined delay has a non-zero duration.

9. The method of claim 5, wherein a plurality of DCIs are received, wherein each of the plurality of DCIs is associated with its own predefined delay value, and wherein the deactivated SS set is activated at the earliest activation time instant as determined by delay values associated with the plurality of DCIs.

10. A method of wireless communication performed by a user equipment (UE), the method comprising:
monitoring a physical downlink control channel (PDCCH) monitoring occasion defined by an active search space (SS) set;
receiving, during the PDCCH monitoring occasion, a downlink control information (DCI);
activating at least one deactivated SS set based on the DCI and a mapping that associates an SS set to a DCI type, DCI format, transmission direction, or combinations thereof; and
wherein activating the at least one deactivated SS set comprises activating a plurality of deactivated SS sets.

11. The method of claim 1, wherein the mapping defines at least one triggering condition under which a deactivated SS set is to be activated.

12. The method of claim 1, wherein the mapping associates one or more source SS sets to one or more target SS sets wherein the UE maintains PDCCH monitoring in one or more of the source SS sets when PDCCH monitoring in one or more of the target SS sets is deactivated.

13. The method of claim 12, wherein at least one of the one or more source SS sets comprises a common SS (CSS) set or a UE-specific SS (USS).

14. The method of claim 12, wherein the mapping identifies the one or more source SS sets and the one or more target SS sets by their respective SS set identifiers (IDs).

15. The method of claim 12, wherein receiving a DCI on a source SS set triggers activation of a deactivated target SS set according to the mapping.

16. The method of claim 12, wherein the mapping comprises a plurality of source SS sets, each source SS set being associated with at least one target SS set.

17. The method of claim 12, wherein at least one of the one or more source SS sets is associated with a plurality of target SS sets according to the mapping.

18. The method of claim 12, wherein at least one of the one or more target SS sets is associated with a plurality of source SS sets according to the mapping.

19. The method of claim 12, wherein:
the PDCCH monitoring occasion is part of a first source SS set that is associated with a first target SS set;
the PDCCH monitoring occasion is also part of a second source SS set that is associated with a second target SS set different from the first target SS set;
receiving the DCI during the PDCCH monitoring occasion comprises receiving a DCI in a DCI format that is associated with the first source SS set and the second source SS set; and
activating a deactivated SS set comprises activating the first target SS set and the second target SS set.

20. A method of wireless communication performed by a user equipment (UE), the method comprising:
monitoring a subset less than all of physical downlink control channel (PDCCH) monitoring occasions defined by an active search space (SS) set;
receiving, during a PDCCH monitoring occasion, a downlink control information (DCI);
monitoring a larger number of PDCCH monitoring occasions defined by the active SS set; and
activating at least one deactivated SS set based on the DCI and a mapping that associates an SS set to a DCI type, DCI format, transmission direction, or combinations thereof, or both.

21. The method of claim 20 wherein monitoring the subset less than all of the PDCCH monitoring occasions defined by the active SS set comprises monitoring according to a monitoring period.

22. The method of claim 20, wherein monitoring a larger number of PDCCH monitoring occasions defined by the active SS set comprises monitoring all of the PDCCH monitoring occasions defined by the active SS set.

23. A user equipment (UE), comprising:
a memory;
at least one transceiver; and
at least one processor communicatively coupled to the memory and the at least one transceiver, the at least one processor configured to:
monitor a physical downlink control channel (PDCCH) monitoring occasion defined by an active search space (SS) set;
receive, via the at least one transceiver, during the PDCCH monitoring occasion, a downlink control information (DCI);
activate at least one deactivated SS set based on the DCI and a mapping that associates an SS set to a DCI type, DCI format, transmission direction, or combinations thereof; and
wherein the DCI type comprises at least one of a data scheduling DCI, a sounding reference signal (SRS) request DCI, a channel state information (CSI) request DCI, a transmit power control DCI, a slot format indication DCI, a DCI for uplink, a DCI for downlink and/or a DCI for both uplink and downlink.

24. The UE of claim 23, wherein the at least one processor is further configured to monitor all of the PDCCH monitoring occasions defined by the activated SS set.

25. The UE of claim 23, wherein the at least one processor is further configured to monitor a subset less than all of the PDCCH monitoring occasions defined by the activated SS set.

26. The UE of claim 23, wherein at least a portion of the mapping is statically defined, semi-statically or dynamically provisioned, or provided to the UE via radio resource control (RRC) or medium access control (MAC) control element (MAC-CE).

27. A user equipment (UE), comprising:
a memory;
at least one transceiver; and
at least one processor communicatively coupled to the memory and the at least one transceiver, the at least one processor configured to:
monitor a physical downlink control channel (PDCCH) monitoring occasion defined by an active search space (SS) set;
receive, via the at least one transceiver, during the PDCCH monitoring occasion, a downlink control information (DCI);
activate at least one deactivated SS set based on the DCI and a mapping that associates an SS set to a DCI type, DCI format, transmission direction, or combinations thereof, and
wherein, to activate a deactivated SS set based on the DCI and the mapping, the at least one processor is configured to activate the deactivated SS set after a predefined delay after receiving the DCI.

28. The UE of claim 27, wherein the predefined delay is based on a DCI type and/or DCI format of the DCI received.

29. The UE of claim 27, wherein the predefined delay has a zero duration.

30. The UE of claim 27, wherein the predefined delay has a non-zero duration.

31. The UE of claim 27, wherein a plurality of DCIs are received, wherein each of the plurality of DCIs is associated with its own predefined delay value, and wherein the deactivated SS set is activated at the earliest activation time instant as determined by delay values associated with the plurality of DCIs.

32. A user equipment (UE), comprising:
a memory;
at least one transceiver; and
at least one processor communicatively coupled to the memory and the at least one transceiver, the at least one processor configured to:
monitor a physical downlink control channel (PDCCH) monitoring occasion defined by an active search space (SS) set;
receive, via the at least one transceiver, during the PDCCH monitoring occasion, a downlink control information (DCI);
activate at least one deactivated SS set based on the DCI and a mapping that associates an SS set to a DCI type, DCI format, transmission direction, or combinations thereof; and
wherein, to activate the at least one deactivated SS set, the at least one processor is configured to activate a plurality of deactivated SS sets.

33. The UE of claim 23, wherein the mapping defines at least one triggering condition under which a deactivated SS set is to be activated.

34. The UE of claim 23, wherein the mapping associates one or more source SS sets to one or more target SS sets wherein the UE maintains PDCCH monitoring in one or more of the source SS sets when PDCCH monitoring in one or more of the target SS sets is deactivated.

35. The UE of claim 34, wherein at least one of the one or more source SS sets comprises a common SS (CSS) set or a UE-specific SS (USS).

36. The UE of claim 34, wherein the mapping identifies the one or more source SS sets and the one or more target SS sets by their respective SS set identifiers (IDs).

37. The UE of claim 34, wherein receiving a DCI on a source SS set triggers activation of a deactivated target SS set according to the mapping.

38. The UE of claim 34, wherein the mapping comprises a plurality of source SS sets, each source SS set being associated with at least one target SS set.

39. The UE of claim 34, wherein at least one of the one or more source SS sets is associated with a plurality of target SS sets according to the mapping.

40. The UE of claim 34, wherein at least one of the one or more target SS sets is associated with a plurality of source SS sets according to the mapping.

41. The UE of claim 34, wherein:
the PDCCH monitoring occasion is part of a first source SS set that is associated with a first target SS set;
the PDCCH monitoring occasion is also part of a second source SS set that is associated with a second target SS set different from the first target SS set;
receiving the DCI during the PDCCH monitoring occasion comprises receiving a DCI in a DCI format that is associated with the first source SS set and the second source SS set; and
activating a deactivated SS set comprises activating the first target SS set and the second target SS set.

42. A user equipment (UE), comprising:
a memory;
at least one transceiver; and
at least one processor communicatively coupled to the memory and the at least one transceiver, the at least one processor configured to:
monitor a subset less than all of physical downlink control channel (PDCCH) monitoring occasions defined by an active search space (SS) set;
receive, via the at least one transceiver, during a PDCCH monitoring occasion, a downlink control information (DCI);
monitor a larger number of PDCCH monitoring occasions defined by the active SS set; and
activate at least one deactivated SS set based on the DCI and a mapping that associates an SS set to a DCI type, DCI format, transmission direction, or combinations thereof, or both.

43. The UE of claim 42, wherein monitoring the subset less than all of the PDCCH monitoring occasions defined by the active SS set comprises monitoring according to a monitoring period.

44. The UE of claim 42, wherein, to monitor a larger number of PDCCH monitoring occasions defined by the active SS set, the at least one processor is configured to monitor all of the PDCCH monitoring occasions defined by the active SS set.

\* \* \* \* \*